UNITED STATES PATENT OFFICE 2,181,160

MOISTUREPROOFED MATERIAL

Fred K. Shankweiler, Newport, Del., assignor to Hercules Powder Company, Wilmington, Del., a corporation of Delaware No Drawing. Application August 11, 1934, Serial No. 739,470

4 Claims. (Cl. 91—68)

This invention relates to a moistureproofed material, more particularly the material contemplated by the invention comprises a sheet of fibrous cellulosic material such as paper, including glassine paper, cartonboard, etc. or of non-fibrous cellulosic material such as, regenerated cellulose ("Cellophane"), and the like, moistureproofed by means of a coating comprising a composition including essentially chlorinated rubber and a wax.

The moistureproofed material contemplated by this invention is characterized by the fact that the film formed on the base is substantially transparent due to control of the amount of wax contained in the composition used for forming the film. The composition used to form the film on the base will contain wax in sufficient quantity to insure in the film a high degree of resistance to penetration of the moisture and, at the same time, will be in insufficient quantity to negative substantial transparency in the film formed or to give a flattening effect in the film.

In general, the material contemplated by this invention will comprise a sheet of cellulosic material as, for example, paper, cartonboard, regenerated cellulose, and the like coated with a substantially transparent film, which will comprise essentially chlorinated rubber and a wax in insufficient quantity to negative substantial transparency in the film. Preferably a relatively non-porous, transparent cellulosic material will be employed as the base, as, for example, glassine paper, regenerated cellulose etc., or, less desirably, a semi-transparent paper, as, for example, onion-skin paper. Such a transparent base coated with a transparent moistureproofing composition provides a protective wrapping or packaging material of great value. The composition may contain various ingredients in addition to chlorinated rubber and wax, as may be desired. For example, the composition may include a plasticizer, gum or resin, natural or synthetic, etc.

Of the essential ingredients of the composition in accordance with this invention the chlorinated rubber may be either chlorinated raw rubber or chlorinated vulcanized rubber, or mixtures thereof, both being contemplated as within the term "chlorinated rubber". While the chlorinated rubber will preferably have a relatively high percentage of chlorine, say above 67%, it will be understood that rubber containing any substantial percentage of chlorine, say as low as 50%, will be usable.

The chlorinated rubber, either raw or vulcanized, may be obtained from any source, or may be produced in any suitable manner. Thus, for example, suitable chlorinated rubber may be produced from vulcanized rubber by boiling the rubber with caustic to remove free sulphur, washing substantially free of alkali and neutralizing any residual caustic. The rubber thus purified may be chlorinated by suspending it, for example, in carbon tetra-chloride or other suitable liquid in which the final product will be soluble and which will be unaffected by chlorine and passing chlorine gas into the liquid, all, as for example, is more fully disclosed in U. S. Patent No. 1,377,152 to Bedford and Kelly.

Again, suitable chlorinated rubber may be prepared by placing unvulcanized rubber in a liquid which is a good solvent therefor as well as for chlorinated rubber, such as, for example, carbon tetrachloride, and then chlorinating with chlorine gas, as, for example, as is more fully disclosed in United States Patent No. 1,544,530 to Carlton Ellis. Other methods for the production of suitably chlorinated rubber are disclosed, for example, in the United States patents to Carlton Ellis No. 1,544,529 and to Peachy No. 1,234,381. It will, of course, be understood that suitably chlorinated rubber for use in connection with this invention may be produced in any desired manner, the references made herein being for illustrative purposes only.

The wax may be of any desired type, as for example, paraffine, carnauba wax, beeswax, candelilla wax, montan wax, etc. etc. or a waxy substance, such as stearic acid, "vaseline", oxidized paraffine, and the like.

Where other ingredients are included, such may, for example, be a hardening agent as a resin such as ester gum, phenol-formaldehyde resins, a copal, etc., etc. a plasticizer, as for example, dibutyl phthalate, tricresyl phosphate, linseed oil, etc., etc., it being understood that various other ingredients, as pigments, dyes, etc. may be included if desired.

The solvent may be any suitable solvent or mixture of solvents which will effectively dissolve the chlorinated rubber and wax and other ingredients where included, and which may be dissipated on application of the composition to material or surfaces to be moistureproofed. It will, of course, be understood that the solvent acts merely as a vehicle for the application of the composition. Thus, the solvent may be a hydrocarbon, as benzene, toluene, xylene, etc., etc. or mixtures thereof. Where, for example, an ester gum is included in the composition, a solvent therefor, as, for example, an alcohol, will be included and similarly where the solvent for the chlorinated rubber and wax is not adaptable or desirable as a solvent for such other ingredients as may be included in the composition, such other solvent or solvents therefor may be included.

The components of the composition may be included in widely varying amounts and proportions within limits which will give a film of substantial transparency on dissipation of the solvent. For illustration, the wax may be included in amount within say about the range 1-10% by weight with chlorinated rubber in amount within about the range 99-90% by weight, within which ranges a desirably transparent moistureproof film will be obtained. Where other ingredients are included, such may be included in widely varying proportions. For illustration, where a resin is included, such may be included in amount say up to about 20% by weight. Plasticizer may be included in amount say up to about 20% by weight and such other ingredients as may be included may be included in amounts depending upon the nature of the ingredients and the function for which they are intended.

The amount of solvent used will depend upon the viscosity desired for the composition and will depend, for example, upon the mode of its application and upon the thickness of film desired.

As typical of a composition embodying this invention, for example, a satisfactory composition may include 90% chlorinated rubber, having desirably above 67% chlorine content and 10% paraffine, sufficient solvent being added to give the desired plasticity for application of the composition as may be intended as, for example, by brushing or spraying.

As a further illustration, a satisfactory composition may include, for example, 80% chlorinated rubber, 16% dibutyl phthalate and 4% paraffine, such solvent being added as to enable application of the composition.

The moistureproof material in accordance with this invention, as will be obvious, may be in sheet, strip, or other form. In producing the material in accordance with this invention the base, as, for example, cartonboard; paper, as, glassine paper, onion-skin paper, etc.; regenerated cellulose, etc., may be coated with the composition in any suitable manner as by brushing, spraying, dipping, etc. After application, the solvent will be dissipated, as, for example, by evaporation, with the formation of a moistureproof, substantially transparent film upon the surface of the base. Where the maximum degree of transparency is desired, as with a transparent base, the moistureproofing material will be applied so as to give a coating of only such thickness as not to impair the transparency of the moistureproof product.

This application is filed as and constitutes a continuation in part of my copending applications Serial No. 590,996, filed February 4, 1932, and Serial No. 696,643, filed November 4, 1933.

I have not claimed herein the moistureproofing composition described since such forms the subject matter of and is claimed in my said application, Serial No. 590,996, filed February 4, 1932.

What I claim and desire to protect by Letters Patent is:

1. A sheet of glassine paper coated with a thin film composed of a composition including chlorinated rubber and a wax, the wax being in amount such that the said film will be substantially transparent.

2. A sheet of glassine paper coated with a thin film composed of a composition including chlorinated rubber, a plasticizer and a wax, the wax being in amount such that the said film will be substantially transparent.

3. A sheet of glassine paper coated with a thin film composed of a composition including chlorinated rubber and a wax in amount of about 1% to about 10%, and the said film being substantially transparent.

4. An article of manufacture comprising a sheet of glassine paper coated with a composition comprising a film-forming substance and a moistureproofing wax in proportions and of a thickness to produce a transparent moistureproof product, said film-forming substance being chlorinated rubber.

FRED K. SHANKWEILER.